United States Patent [19]

Rossman

[11] Patent Number: 5,588,204

[45] Date of Patent: Dec. 31, 1996

[54] APPARATUS FOR INSTALLING SPRING RETAINING RINGS

[75] Inventor: Kenneth J. Rossman, Kendall Park, N.J.

[73] Assignee: Rotor Clip Company, Inc., Somerset, N.J.

[21] Appl. No.: 517,407

[22] Filed: Aug. 21, 1995

Related U.S. Application Data

[63] Continuation-in-part of Ser. No. 309,854, Sep. 21, 1994, abandoned.

[51] Int. Cl.$^6$ .............................. B23Q 7/10; B23P 19/04
[52] U.S. Cl. .............................. 29/809; 29/811.2; 29/229
[58] Field of Search .................................. 29/809, 811.2, 29/225, 229

[56] References Cited

U.S. PATENT DOCUMENTS

| | | |
|---|---|---|
| 2,487,803 | 11/1949 | Heimann . |
| 2,755,698 | 7/1956 | Wurzel . |
| 2,978,801 | 4/1961 | Erdmann . |
| 2,995,811 | 8/1961 | Erdmann . |
| 3,442,171 | 5/1969 | Engelmann . |
| 3,595,123 | 7/1971 | Wurzel . |
| 4,099,444 | 7/1978 | Millheiser . |
| 4,189,062 | 2/1980 | Jackson . |
| 4,550,485 | 11/1985 | Killian . |
| 4,592,122 | 6/1986 | Sikula . |
| 4,667,399 | 5/1987 | Berliner . |
| 5,315,746 | 5/1994 | Machino . |

*Primary Examiner*—David P. Bryant
*Attorney, Agent, or Firm*—Lerner, David, Littenberg, Krumholz & Mentlik

[57] ABSTRACT

An apparatus for installing a spring retaining ring into a groove of a workpiece includes a storage unit, a passageway, a groove locator and a pusher. The passageway delivers the ring from the storage unit to the groove and includes interior and exterior portions as well as orientation member for orientation of the ring during its motion through the interior of the passageway. The substantially flat, spring-type groove locator has one of its ends connected to the passageway and another free end adapted for engagement with the groove. The pusher is movable within the passageway for forcible delivery of the spring retaining ring to the groove. In the operation, the free end of the groove locator is positioned within the groove to guide movement of the ring prior to its entry into the groove, whereas the free end of the groove locator is forcibly removed from the groove upon the ring entering the same.

8 Claims, 3 Drawing Sheets

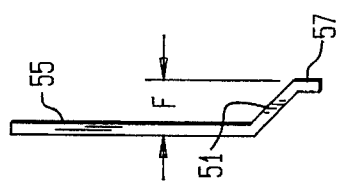
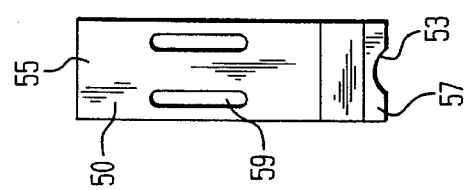
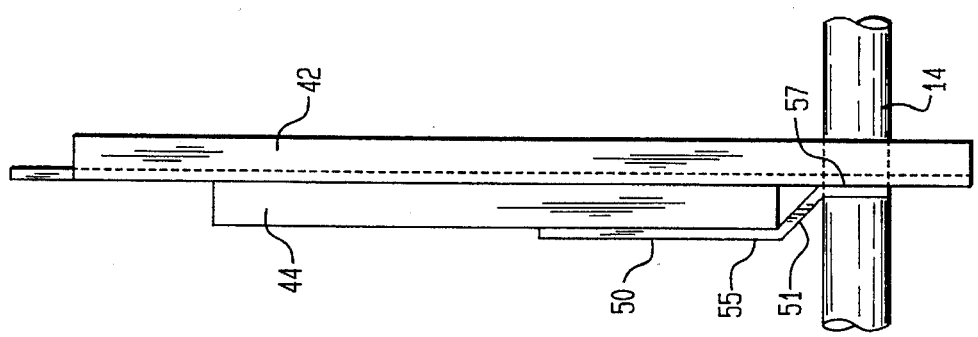
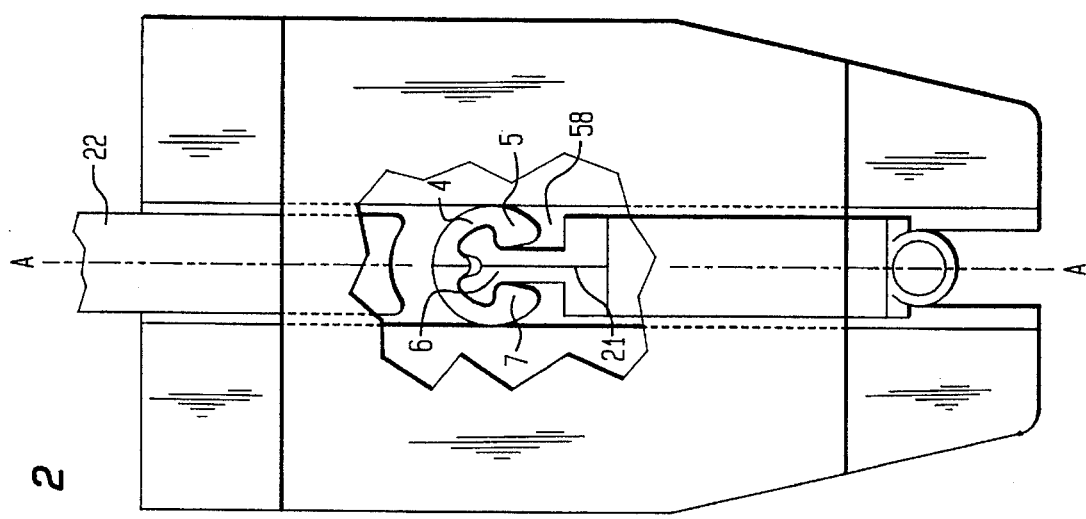

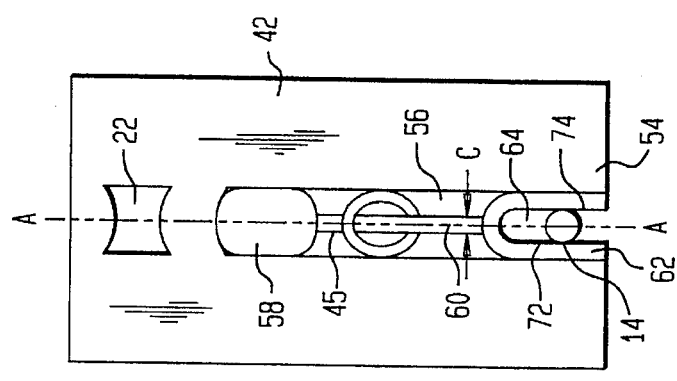
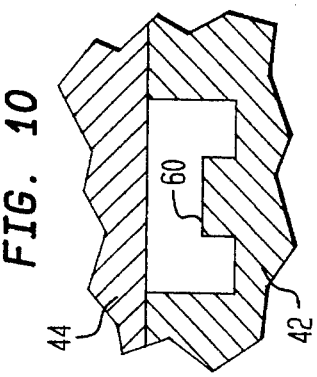
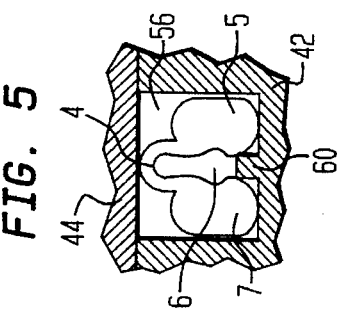
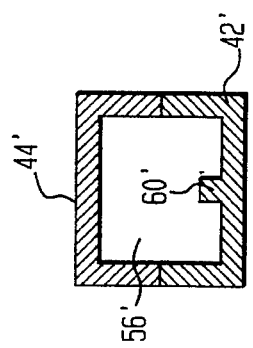
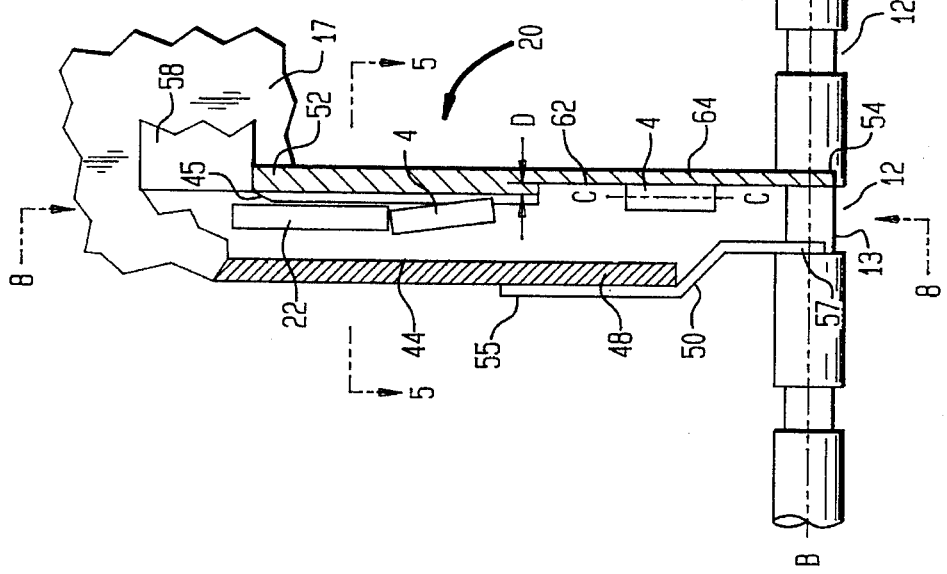

APPARATUS FOR INSTALLING SPRING RETAINING RINGS

This is a continuation-in-part application of Ser. No. 309,854 filed Sep. 21, 1994 which is now abandoned.

FIELD OF THE INVENTION

The present invention relates to devices for installing spring retaining rings and, more particularly, it relates to an apparatus and method of its use for installing spring retaining rings into grooves of workpieces.

BACKGROUND OF THE INVENTION

A flexible retaining ring positioned within a groove of a workpiece effectively provides an abutment preventing axial displacements of parts mounted on the workpiece. In the assembly operations, initially, the flexible retaining ring is typically placed in the vicinity of the corresponding groove of the workpiece and then shifted to a position in which the retaining ring embraces the groove along its exterior surface. The retaining ring is typically installed by pushing its opening against the groove, causing the ring ends to separate. After the expanded ring engages the groove, the ends of the ring snap back to secure the ring in place. A properly installed retaining ring locks itself against the corresponding groove with a holding power enabling the ring to resist forces directed along a longitudinal axis of the workpiece as well as impact and shock forces, so as to prevent undesirable shifting of the ring and parts mounted on the workpiece.

Rapid development of industries utilizing assembly operations employing the spring retaining rings has created a continuous demand for progressively greater speed of the ring's installing operations as well as increased reliability of their engagement with the workpiece. To satisfy these demands, devices such as fluid driven applicators forcibly inserting the retaining rings into grooves of workpieces, could be employed.

In using such applicators, an important task is to deliver the retaining ring to the workpiece in such a manner that an opening or gap of the ring faces and is aligned with a corresponding groove. However, if the opening in the ring is not properly aligned with the corresponding groove, upon application of forces the ring could be smashed against a workpiece clogging the applicator as well as damaging the groove. Yet another problem with rings which are not properly aligned with corresponding grooves, is that a ring can be installed only partially within the groove and partially outside the groove. If not detected, this condition will yield a defective workpiece assembly and ultimately could lead to a more serious problem for the final product. Defects of this nature materially reduce the yield of good devices and introduce defects into the product stream. Such problems are particularly acute with those assemblies utilizing relatively thin retaining rings installed into narrow grooves and utilizing workpieces having small distances between adjacent grooves.

Various approaches have been taken toward resolving the above-mentioned problems. For example, U.S. Pat. No. 4,667,399 to Berliner provides a specially designed spring retaining ring and a power gun for its installation. In order to prevent rotation of the ring during its motion within the power gun and to provide a proper alignment between the opening of the ring and the corresponding groove of the workpiece, the ring of '399 patent is formed having two flat portions on each side thereof. Such flat portions engage sides of a delivery passageway of the power gun and prevent the ring from undesired radial movements. However, the circumferential exterior shape of the retaining rings is widely accepted in industry. Therefore, the application for the rings having flats on their sides is substantially limited. Furthermore, manufacture of rings having such flats is often more expensive than that of the rings having a circumferential or curved exterior. The apparatus of '399 patent contains two movable groove locators which are complicated in manufacturing and maintenance and do not effectively serve their purpose of guiding a ring prior to its installation within the groove.

U.S. Pat. No. 4,550,485 to Killian and U.S. Pat. No. 4,592,122 to Sikula also disclose devices for installing retaining rings into a groove of a workpiece utilizing complicated, movable groove locators which are often jammed during operation of the device, expensive in manufacture and maintenance, and do not prevent a ring turning within the applicator.

Despite the substantial time and effort devoted heretofore to the problems associated with installing retaining rings into grooves of workpieces, there have still been substantial, unmet needs for improvements in such equipment. Thus, there has been a considerable need for a universal, simple, inexpensive and reliable apparatus which is capable of providing a proper alignment during the inserting operation between an opening of a retaining ring and a corresponding groove as well as assuring ultimate reliable engagement between the ring and the workpiece. There is a need for the apparatus which should not require constant and often expensive maintenance.

SUMMARY OF THE INVENTION

One aspect of the present invention provides an apparatus for installing at least one spring retaining ring having a gap into a groove of a workpiece. In the apparatus, a passageway is provided for delivery of the spring retaining ring from a storage unit to the groove of the workpiece. The passageway has interior and exterior portions and orientation means for orientation of the spring retaining ring during its motion through an interior of the passageway. A substantially, flat spring-type groove locator is provided having one end thereof connected to an exterior of the passageway and a free end. A pusher is movable within the passageway for forcible delivery of the spring retaining ring to the groove. In use, the free end of the spring-type groove locator is positioned within the groove to guide movement of the ring prior to entering into the groove. The free end of the groove locator is forcibly removed from the groove upon the ring entering the same.

In another aspect of the invention, the orientation means is slidably received within the gap of the retaining means and orients the ring in such a manner that the gap faces the groove of the workpiece during the movement of the ring within the passageway.

Alternatively, the orientation means is made in a form of elongated member extending along a longitudinal axis of the passageway and has a substantially rectangular cross-section.

According to another alternative arrangement, the passageway is formed between a base and a connecting plate. The base and the connecting plate each has exterior and interior portions, so that the orientation means is situated within the interior portion of the base. The substantially flat, spring-type groove locator has a proximal end and a distal end having a cutout portion. In an engaged position between the device and the workpiece, prior to inserting the spring retaining ring into the groove, the device is supported by the free end of the groove locator situated within the groove, while a portion of the workpiece adjacent to the groove is positioned within the cutout portion of the base.

A further aspect of the invention provides a method of inserting a spring retaining ring having a gap within a groove of a workpiece using an apparatus comprising a passageway for delivery of the spring retaining ring from a storage unit to the groove of the workpiece. The passageway has interior and exterior portions and orientation means for orientation of said spring retaining ring during its movement through the interior of the passageway. A substantially flat, spring-type groove locator is formed having one end thereof connected to the exterior of the passageway and another free end. A pusher is movable within the passageway for forcible delivery of the spring retaining ring to the groove. According to the method, the free end of the groove locator is initially positioned within the groove. Then, said pusher engages said retaining ring in such a manner that the orientation means is slidably received within the gap and the retaining ring is moved longitudinally through the passageway having its gap oriented towards the groove. The ring is guided by the free end of the groove locator prior to entering into the groove. The free end of the groove locator is forcibly removed from the groove upon the ring entering the same.

BRIEF DESCRIPTION OF THE DRAWINGS

Other advantages and features of the invention are described with reference to exemplary embodiments, which are intended to explain and not to limit the invention, and are illustrated in the drawings in which:

FIG. 2 shows an elevational, partially sectional view of a ring dispensing assembly;

FIG. 3 is a partial, side elevational view of the ring dispensing assembly positioned on the workpiece;

FIG. 4 is a partial, sectional view showing the ring dispensing assembly positioned on the workpiece;

FIG. 5 is a sectional view according to the sectional line 5—5 of FIG. 4;

FIG. 6 is a front elevational view of a groove locator of the invention;

FIG. 7 is a side elevational view of the groove locator;

FIG. 8 is a cross-sectional view according to the sectional line 8—8 of FIG. 4;

FIG. 9 is a sectional view similar to FIG. 5 showing another embodiment of the invention; and FIG. 10 shows a cross-sectional view of the ring orientation unit.

DETAILED DESCRIPTION OF THE PREFERRED EMBODIMENT

Figure 1:
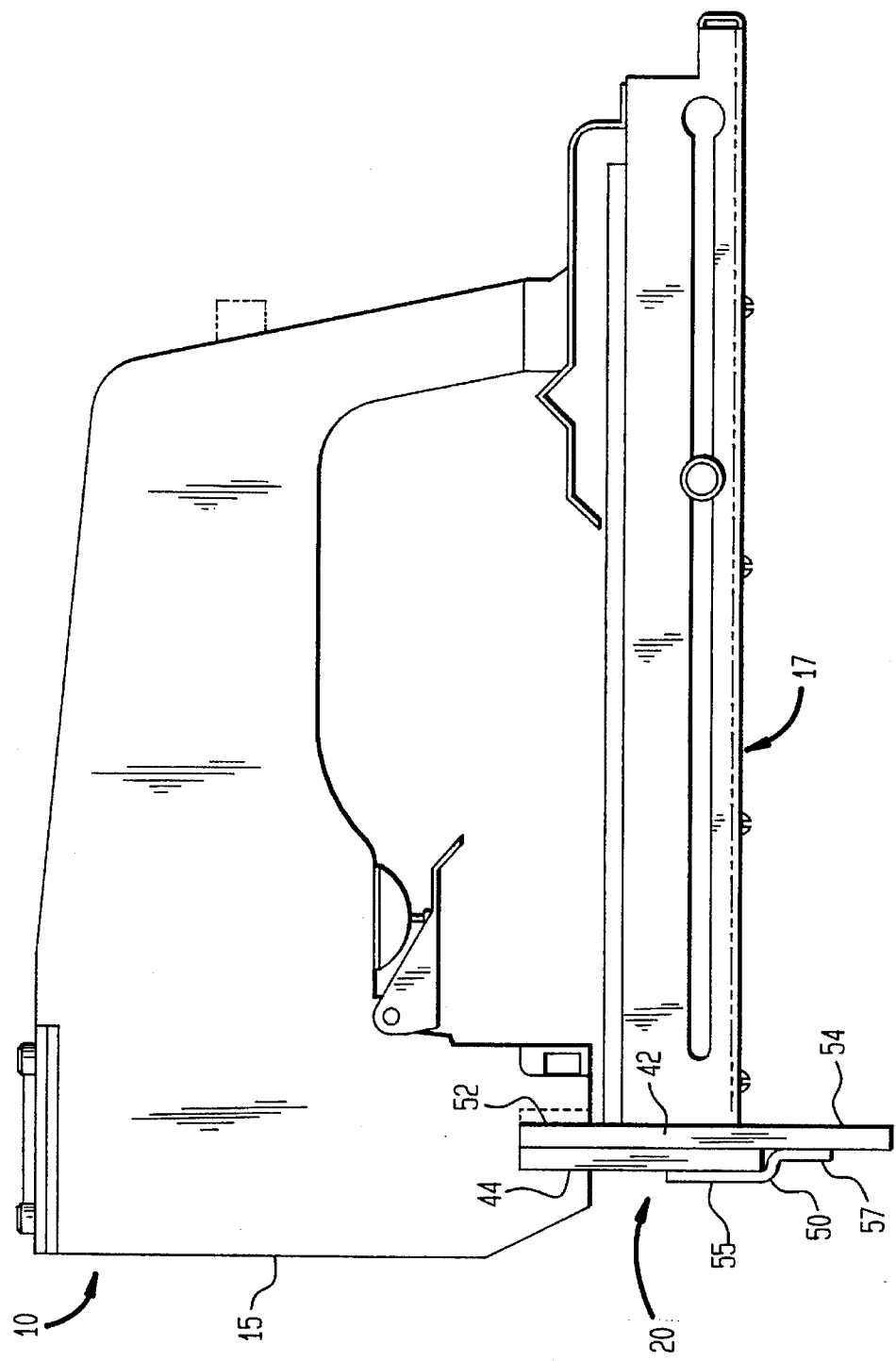
FIG. 1 is a side elevational view showing an apparatus for installing spring retaining rings of the invention.

Although specific embodiments of the invention will now be described with reference to the drawings, it should be understood that the embodiments shown are by way of examples only and merely illustrative of but few of many possible specific embodiments which represent application of the principles of the invention. Various changes and modifications obvious to one skilled in the art to which the invention pertains are deemed to be within the spirit, scope and contemplation of the invention as further defined in the appended claims.

FIG. 1 illustrates an apparatus 10 for installing spring retaining ring into a groove of a workpiece. Such apparatus typically comprises a handheld housing 15 having a magazine 17 containing a plurality of retaining rings and a ring dispensing assembly 20. The spring operated magazine 17 supplies retaining rings to the dispensing assembly 20. The housing contains a pusher 22 (see FIGS. 2, 4, 8) and a mechanism driven by fluid, preferably air, for its energizing. The magazine usually includes a spring-biased arm (not shown) which presses against a stack of retaining rings and urges such rings forwardly in the direction of the dispensing assembly. The retaining rings are slidably mounted upon a rail 21 (see FIG. 2) disposed within the magazine 17. The rail terminates at a receiving window 58 of the dispensing assembly, so that the ring positioned at the very end of the stock closest to the pusher is picked up during the next stroke of reciprocal motion thereof.

A spring retaining ring 4 utilized by the apparatus of the present invention, as best illustrated in FIG. 5, is formed by an inner edge of curved shape. Two legs 5 and 7 are separated by a gap or opening 6 having the width of slightly smaller dimension than that of the diameter of a corresponding groove of the workpiece. The material of the ring is resilient enough to enable the ring to be spread over the groove, so that in the assembled condition the inner edge of the ring abuts against the groove with spring pressure assuring close engagement between the interior of the ring and the neck of the groove.

The ring dispensing assembly 20 (best illustrated in FIGS. 1, 2, 3 and 4) consists of a base 42 and a connecting plate 44 spaced from each other. The connecting plate 44 is formed having inner and outer surfaces as well as a first end 46 engaging the housing 15 and a second end 48 adapted to receive a groove locator 50. The base 42 having interior and exterior portions extends longitudinally from its proximal end 52 to a distal end thereof 54. A delivery passageway 56 is formed within the ring dispensing assembly between the base 42 and the connecting plate 44. In the preferred embodiment of the invention (see FIG. 5), the passageway 56 is substantially formed within the interior portion of the base 42, whereas the inner surface of the connecting plate 44 serves as a connecting wall. FIG. 5 shows the retaining ring 4 having configuration different from the ring of FIG. 2.

The passageway 56 extends along a longitudinal axis of the ring dispensing assembly A—A from the receiving window 58 to about the proximal end 54 of the base 42. A track or orientation means 60 is provided within the base part of the passageway 56. The end of the track 60 situated adjacent the window 58 is provided with a chamfer 45 facilitating initial engagement between the legs of the ring and the track. In the lengthwise direction the track 60 extends along the axis A—A. In the preferred embodiment of the invention (see FIGS. 5 and 10), track 60 has a substantially rectangular cross-section extending from the base 42 in the direction of the connecting plate 44. To facilitate sliding motion of the retaining ring along the passageway, the width C of the track 60 is slightly smaller than the width of the gap of the retaining ring.

A recess 62 is provided within the passageway 56 in the vicinity of the proximal end 54 of the base. In the preferred embodiment of the invention, the depth D of the recess 62 is about half of the thickness of the retaining ring dispensed by the invention. However, any other suitable depth of the recess allowing efficient engagement between the ring and the pusher is within the scope of the invention.

To facilitate engagement between the dispensing assembly and the workpiece and to stabilize position of the apparatus on the workpiece during the insertion process, the base 42 is provided within a cutout portion 64 situated at the distal end 54. It is shown in FIGS. 8 and 4 that the cutout portion 64 extending through the entire thickness of the base in the area of the recess 62 is formed by two walls 72 and 74 which are substantially parallel to each other. The width of the cutout portion or the distance between the walls 72 and 74 is slightly greater than the outside diameter of the workpiece, so that in the working condition the workpiece can be easily inserted into the cutout portion 64.

The groove locator 50 (best illustrated in FIGS. 4, 6 and 7) is a thin, substantially flat member made of a spring-type material which could be steel. A substantially flat, elongated adjusting part 55 is connected through an intermediate portion 51 to an engaging part 57. It is shown in FIG. 6 that the engaging part 57 contains an engaging depression 53. The configuration and depth of the depression 53 should facilitate stable engagement between the neck of the groove. It is shown in FIG. 7 that in the sidewise direction the engaging part 57 is offset from the adjusting part 55 a distance F substantially equal to the thickness of the connecting plate 44. In the assembled condition of the ring dispensing unit 20 (see FIG. 4), the adjusting part 55 is connected to the outer surface of the connecting plate 44 and the engaging part 57 extends within the passageway providing guidance to the ring prior to its entry to the corresponding groove of the workpiece. Elongated slots 59 (see FIG. 7) are situated within the adjusting part 55 and adapted to receive fasteners connecting the groove locator 50 to the connecting plate 44. The elongated nature of the slots 59 facilitates adjustment of the groove locator 50 on the connecting plate, so that one model of the ring dispensing assembly 20 of the invention is capable of accommodating workpieces having grooves of varying depth and diameter. The extent of the passageway can be adjusted by moving the plate 44 regarding the base 42 in the direction of the axis A—A. This facilitates proper positioning of the ring within the groove.

In the operation of the embodiment of the invention illustrated in FIGS. 4 and 8, the device having the ring dispensing assembly 20 of the invention is initially positioned in the vicinity of the workpiece 14. The groove locator 50 in general and its engaging part 57 with the depression 53 specifically engage an upper part and sides of the neck 13 of the groove 12 prepared to receive the retaining ring 4. A part of the workpiece between the groove 12 currently receiving the ring and the adjacent groove 12' is straddled between the walls 72 and 74 of the cutout portion 64 of the base 42. Such arrangement provides additional stability for the device of the invention during the ring inserting operation. Therefore, the ring dispensing assembly of the invention is prevented from movements not only in the axial direction of the workpiece but also in the sidewise direction transverse to the longitudinal axis of the workpiece. This facilitates the required alignment between the open end of the passageway 56 and the groove 12 currently receiving the ring.

Prior to energizing the device and activating the pusher, the next ring available for insertion is positioned within the window 58 of the base 42 at the very end of the rail 21 of the magazine 17. At that position (see FIG. 2), the legs 5 and 7 and the gap or opening 6 of the ring are oriented towards the passageway 56 and the workpiece, whereas a rear part of the outside periphery of the ring faces the pusher 22. Upon activating the device, the pusher 22 sliding in the direction of the workpiece pushes the ring 4 into the passageway 56. The chamfer 45 facilitates transition of the ring 4 from the rail 21 of the magazine into the passageway 56 in such a manner that the track or orientation means 60 is slidably received within the gap of the ring between its legs. Such position minimizes motion of the ring in the direction transverse to the axis A—A of the dispensing assembly and the passageway 56. Furthermore, the exterior of the ring is confined by the boundaries of the passageway 56. This arrangement prevents the ring from any rotational movements while it travels through the passageway 56. This is necessary to ensure that the gap of the ring is always oriented toward the corresponding groove of the workpiece. As illustrated in FIG. 4, the retaining ring 4 initially travels through the passageway 56 in a slightly inclined position having its legs engaging the interior portion of the base 42, while the rear exterior part of the ring 4 contacts the inner surface of the connecting plate. Such angular position of the ring provides better control and efficient handling of the ring while it travels through the dispensing assembly.

As the ring approaches the end of the track or orientation means 60, the legs first enter into the recess 62 followed by the remaining parts of the ring. In this intermediate position within the passageway 56, the ring is guided on one side by the surface of the recess 62 and from the other side the ring is guided by the engaging part 57 of the groove locator facing the base 42. It is shown in FIG. 4 that prior to entering the groove 12, the ring 4 engages the substantially flat surface of the recess having its longitudinal axis C—C extending substantially parallel to the longitudinal axis of the passageway 56. In the ideal situation, the longitudinal axis C—C of the ring 4 prior to entering the groove 12 is substantially perpendicular to the longitudinal axis B—B of the workpiece 14 and the corresponding groove 12. Immediately prior to the entry into the groove, the ring 4 sliding along the surface of the recess 62 is guided by the substantially flat engaging part 57 of the groove locator 50. This guidance enhances the precision of the delivery of the ring directly to the groove.

At the final step of the insertion process, the engaging part 57 of the groove locator 50 is removed from the groove, freeing it from any obstruction, so that the ring 4 can be efficiently positioned therein. The spring retaining ring 4 actually substitutes for the engaging part 57 of the groove locator within the groove 12 of the workpiece.

In another embodiment of the invention (see FIG. 9), the delivery passageway 56' extends into the body of the base 42' as well as within the interior of the connecting plate 44'. However, similar to the embodiment of FIG. 5, the track or orientation means 60' shown in FIG. 9 also extends from the base.

We claim:

1. An apparatus for installing a spring retaining ring having a gap into a groove of a workpiece, said apparatus comprising:

storage means for initial storing of said spring retaining ring;

a passageway for delivery of said spring retaining ring from said storage means to said groove of the workpiece, said passageway having interior and exterior portions and orientation means for orientation of said spring retaining ring during its motion through the interior of said passageway;

a substantially flat, springy groove locator having one end thereof connected to the exterior of said passageway and a free end adapted to be positioned into the groove of the workpiece; and a pusher movable within said passageway for forcible delivery of said spring retaining ring to said groove;

wherein said orientation means is slidably received within said gap of said retaining ring and orients said spring retaining ring in such a manner that said gap faces said groove of the workpiece during said motion of said spring retaining ring within said passageway; and whereby said free end of said springy groove locator, when positioned within said groove guides said motion of said spring retaining ring prior to entering into said groove and said free end is forcibly removed from said groove upon said spring retaining ring entering said groove.

2. The apparatus of claim 1, wherein said orientation means is an elongated member extending along a longitudinal axis of said passageway and having a substantially rectangular cross-section.

3. The apparatus of claim 1, wherein said passageway is formed between a base and a connecting plate, said base and connecting plate having exterior and interior portions, said orientation means is formed within the interior portion of the base, said substantially flat, springy groove locator extends outwardly from the exterior portion of the connecting plate, and said base has a proximal end and a distal end with a cutout portion, whereby in an engaged position between the apparatus and the workpiece prior to inserting said spring retaining ring into the groove, said apparatus is supported by said free end of the groove locator situated within the groove, while a portion of the workpiece adjacent to said groove is positioned within said cutout portion of the base.

4. The apparatus of claim 3, wherein a recess is formed within the passageway between an end of said orientation means and said distal end of the base, so that prior to said entry of said spring retaining ring into the groove said spring retaining ring is positioned between and guided by said recess and said groove locator.

5. The apparatus of claim 1, wherein said free end of the groove locator springs out from said groove upon entry of said ring therein.

6. An apparatus for installing a spring retaining ring having two legs separated by a gap into a groove of a workpiece, said apparatus comprising:

storage means for initial storage of said spring retaining ring;

a passageway for delivery of said spring retaining ring from said storage means to said groove of the workpiece, a receiving window positioned at the junction of said storage means and said passageway, said passageway having interior and exterior portions and an open end remotely located from said receiving window, and orientation means positioned within said interior portion of the passageway for orientation of said spring retaining ring, said orientation means being an elongated member extending along a longitudinal axis of said passageway; and a pusher movable within said passageway for forcible delivery of said spring retaining ring to said groove;

whereby upon engagement of said ring with said pusher said ring is moved through said passageway in such a manner that said orientation means is slidably received within said recess of said spring retaining ring preventing rotational movement of said ring within said passageway and said legs and said gap of the retaining ring face said groove of said workpiece.

7. The apparatus of claim 6, wherein said orientation means has a substantially rectangular cross-section.

8. The apparatus of claim 6, wherein a recess is formed within the passageway between said open end and said orientation means, so that prior to said entry of said retaining ring into said groove said spring retaining ring engages with and is guided by said recess.

* * * * *